(12) United States Patent
Furue

(10) Patent No.: US 9,157,809 B2
(45) Date of Patent: Oct. 13, 2015

(54) TEMPERATURE MANAGEMENT MEMBER UNDER REDUCED-PRESSURE ATMOSPHERE AND TEMPERATURE MANAGEMENT METHOD UNDER REDUCED-PRESSURE ATMOSPHERE

(75) Inventor: Ryuji Furue, Kawagoe (JP)

(73) Assignee: NICHIYU GIKEN KOGYO CO., LTD., Kawagoe (JP)

( * ) Notice: Subject to any disclaimer, the term of this patent is extended or adjusted under 35 U.S.C. 154(b) by 359 days.

(21) Appl. No.: 13/818,491

(22) PCT Filed: Jul. 22, 2011

(86) PCT No.: PCT/JP2011/066729
§ 371 (c)(1), (2), (4) Date: Feb. 22, 2013

(87) PCT Pub. No.: WO2012/026253
PCT Pub. Date: Mar. 1, 2012

(65) Prior Publication Data
US 2013/0156067 A1    Jun. 20, 2013

(30) Foreign Application Priority Data
Aug. 26, 2010    (JP) .................................. 2010-189275

(51) Int. Cl.
G01K 7/00    (2006.01)
G01K 11/12    (2006.01)
G01K 11/06    (2006.01)

(52) U.S. Cl.
CPC ................ *G01K 11/12* (2013.01); *G01K 11/06* (2013.01)

(58) Field of Classification Search
USPC .................................................. 374/162, 100
See application file for complete search history.

(56) References Cited

U.S. PATENT DOCUMENTS
8,671,871 B2 *    3/2014    Huffman et al. .............. 116/216
(Continued)

FOREIGN PATENT DOCUMENTS
| JP | Y2-4-289 | 1/1992 |
| JP | A-2003-172661 | 6/2003 |
| JP | A-2004-257828 | 9/2004 |
| JP | A-2005-212562 | 8/2005 |

(Continued)

OTHER PUBLICATIONS

International Search Report issued in International Patent Application No. PCT/JP2011/066729 mailed Aug. 16, 2011.

*Primary Examiner* — Mirellys Jagan
(74) *Attorney, Agent, or Firm* — Oliff PLC

(57) ABSTRACT

A temperature management member under a reduced-pressure atmosphere, wherein the difference in the discoloration temperature of a temperature-sensitive discoloration layer between under an atmospheric pressure atmosphere and under a reduced-pressure atmosphere can be minimized. A temperature management member under a reduced-pressure atmosphere includes a temperature-sensitive discoloration layer which contains granular or powdery hot-melt matter that melts at a melting temperature corresponding to a heating temperature to be detected under a reduced-pressure atmosphere and which is discolored in response to the hot melting thereof, and a difference in the melting temperature of the hot-melt matter within the temperature-sensitive discoloration layer between under an atmospheric pressure atmosphere and under the reduced-pressure atmosphere is 5° C. at most.

10 Claims, 2 Drawing Sheets

(56) References Cited

U.S. PATENT DOCUMENTS

| | | | |
|---|---|---|---|
| 2004/0222780 A1* | 11/2004 | Yamada et al. | 324/110 |
| 2006/0011124 A1 | 1/2006 | Odashiro | |
| 2009/0041085 A1* | 2/2009 | Petrakis | 374/187 |
| 2009/0290614 A1* | 11/2009 | Gregory et al. | 374/29 |
| 2012/0027045 A1* | 2/2012 | McLellan et al. | 374/160 |
| 2014/0098834 A1* | 4/2014 | Rohr et al. | 374/102 |

FOREIGN PATENT DOCUMENTS

| | | |
|---|---|---|
| JP | A-2006-29945 | 2/2006 |
| JP | A-2006-153469 | 6/2006 |
| JP | A-2006-257186 | 9/2006 |
| JP | A-2007-57337 | 3/2007 |
| JP | A-2009-2807 | 1/2009 |
| JP | A-2009-36525 | 2/2009 |
| JP | A-2009-139101 | 6/2009 |

* cited by examiner

TEMPERATURE MANAGEMENT MEMBER UNDER REDUCED-PRESSURE ATMOSPHERE AND TEMPERATURE MANAGEMENT METHOD UNDER REDUCED-PRESSURE ATMOSPHERE

TECHNICAL FIELD

The present invention relates to a temperature management member under a reduced-pressure atmosphere, having a temperature-sensitive discoloration layer which discolors at a heating temperature to be detected when heated under a reduced-pressure atmosphere, and a temperature management method under a reduced-pressure atmosphere.

BACKGROUND ART

In such products as precision electronics, processed foods, medicinal drugs etc. which should be kept from high temperatures, strict temperature management is required so as for them not to experience a temperature history in which they are exposed to a temperature higher than a specified temperature, during production processes, storage periods and transportation. For example, temperature management members which are used by attaching them to the products and which have a temperature-sensitive discoloration layer that contains a granular or powdery hot-melt matter having a melting point which is a temperature to be detected and that discolors when the hot-melt matter is melted, are described in, for example, Patent Document 1 and Patent Document 2 below.

In addition, in Patent Document 3, a white-turbid-state opaque material at a room temperature, which is a mixture of a binder and a solid state powder-like chemical material such as a wax which becomes transparent when melted at a predetermined temperature, is screen-printed in a desired pattern on a semiconductor wafer. Then the wafer is inserted into a vacuum chamber and is heat-treated under a reduced pressure, thus measuring a heating distribution on the semiconductor wafer in the vacuum chamber.

PRIOR ART DOCUMENTS

Patent Document

Patent Document 1: Japanese Patent Application Publication 2003-172661A
Patent Document 2: Japanese Patent Application Publication 2006-29945A
Patent Document 3: Japanese Patent Application Publication 2007-57337A

SUMMARY OF THE INVENTION

Problems to be Solved by the Invention

According to a study by the present inventor, when a conventional temperature management member that contains hot-melt matter which discolors when the hot-melt matter is heat-melted, was attached to the object to be heat-treated, and then the object was heat-treated under a reduced-pressure atmosphere, it was often observed that there was a large difference in a discoloration temperature of the temperature-sensitive discoloration layer, between under an atmospheric pressure atmosphere and under a reduced-pressure atmosphere generally. In a case where the temperature management member indicates large differences in the discoloration temperature between under the atmospheric pressure atmosphere and under a reduced-pressure atmosphere, the discoloration temperature should be managed depending on an ambient pressure, being inconvenient. Objects of the present invention is to solve such inconvenience and to provide a temperature management member under a reduced-pressure atmosphere and a temperature management method under a reduced-pressure atmosphere, which can minimize as much as possible the difference in the discoloration temperature of the temperature-sensitive discoloration layer between under the atmospheric pressure atmosphere and under a reduced-pressure atmosphere.

Means to Solve the Problems

The present invention was made to achieve the aforementioned objects. A temperature management member under a reduced-pressure atmosphere of at most 1000 Pa comprises: a temperature-sensitive discoloration layer which contains a granular or powdery hot-melt matter that melts at a melting temperature corresponding to a heating temperature to be detected under a reduced-pressure atmosphere and which discolors in response to the hot melting of the hot-melt matter, wherein a difference in the melting temperature of the hot-melt matter within the temperature-sensitive discoloration layer between any two pressures selected from the group consisting of under an atmospheric pressure atmosphere, under a reduced-pressure atmosphere of 1000 Pa, and under a reduced-pressure atmosphere of 0.1 Pa is 5° C. at most.

In the temperature management member under a reduced-pressure atmosphere, the difference in the melting temperature of the hot-melt matter between said any two pressures is 2° C. at most.

In the temperature management member under a reduced-pressure atmosphere, the temperature-sensitive discoloration layer comprises: a hot-melt matter layer containing granular or powdery hot-melt matter; and a substrate, on one surface side of which the hot-melt matter layer is configured, and the temperature-sensitive discoloration layer discolors in response to the hot melting of the hot-melt matter, by the hot-melt matter layer reduced-pressure atmosphere, the eutectic mixture comprises at least two kinds of the hot-melt matters each having a different melting point, one of the hot-melt matter in the eutectic mixture which has the lowest melting point is contained in the range of 50-90 parts by weight, and another one of the hot-melt matter in the eutectic mixture which has the highest melting point is contained in the range of 50-10 parts by weight.

In the temperature management member under a reduced-pressure atmosphere, the hot-melt matter is an aliphatic compound having at least a carbon number of 3 or a benzophenone compound.

In the temperature management member under a reduced-pressure atmosphere, the aliphatic compound is at least any one of a compound selected from the group consisting of a fatty acid compound, a fatty acid amide compound and becoming transparent and accordingly a surface of the substrate being visually recognized, and/or by the granular or powdery hot-melt matter dissolved with a pigment that coexists therewith.

In the temperature management member under a reduced-pressure atmosphere, the hot-melt matter is a eutectic mixture which comprises at least two kinds of hot-melt matters each having a different melting point.

In the temperature management member under a a fatty acid dihydrazide compound.

A temperature management method under a reduced-pressure atmosphere of the present invention, comprises the steps of:

making a temperature-sensitive discoloration layer containing a granular or powdery hot-melt matter that melts at a melting temperature corresponding to a heating temperature to be detected under a reduced pressure;

adjusting a difference in a melting temperature of the hot-melt matter in the temperature-sensitive discoloration layer, between any two pressures selected from the group consisting of under an atmospheric pressure atmosphere, under a reduced-pressure atmosphere 1000 Pa, and under a reduced-pressure atmosphere of 0.1 Pa, to be 5° C. at most thereby;

preparing the temperature management member under a reduced-pressure atmosphere by arranging a temperature-sensitive discoloration layer which discolors in response to the hot melting, on a substrate thereby;

heating the temperature management member together with the object to be heated at the time of heating the object to be heated under a reduced-pressure atmosphere of at most 1000 Pa; and managing a history that shows whether or not the heating temperature to heat the object to be heated reaches at a temperature to be detected, by checking the discoloration of the temperature-sensitive discoloration layer of the temperature management member.

Effects of the Invention

The temperature management member of the present invention contains the granular or powdery hot-melt matter which is included within the temperature-sensitive discoloration layer, and the difference in the melting temperature of the hot-melt matter between under the atmospheric pressure atmosphere and under the reduced-pressure atmosphere is 5° C. at most. Therefore, the discoloration temperature obtained from the discoloration temperature layer placed under the atmospheric pressure atmosphere can be substantially matched with the discoloration temperature obtained from the discoloration temperature layer placed under the reduced-pressure atmosphere. Accordingly, in the temperature management method under the reduced-pressure atmosphere which utilizes the temperature management member under a reduced-pressure atmosphere of the present invention, the management of the discoloration temperature can be carried out by managing the discoloration temperature under the atmospheric pressure atmosphere. In addition, the temperature-sensitive discoloration layer of the temperature management member under a reduced-pressure atmosphere of the present invention discolors at substantially a certain temperature even though there are fluctuations in the pressure of the reduced-pressure atmosphere. Accordingly, in the temperature management method under the reduced-pressure atmosphere which utilizes the temperature management member under a reduced-pressure atmosphere, the obtained discoloration temperature can be used as it is without calibration according to the reduced-pressure. Management of the discoloration temperature using the temperature management member under a reduced-pressure atmosphere can be simplified.

EXPLANATION OF LETTERS OR NUMERALS

Figure 1:
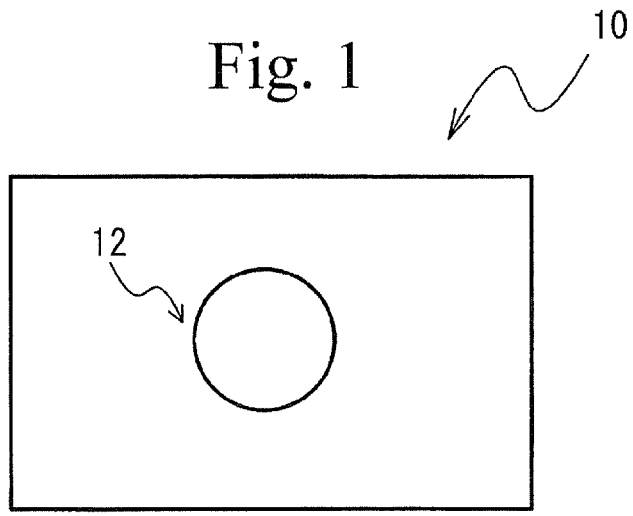
FIG. 1 is a front view for explaining an example of a temperature management member under a reduced-pressure atmosphere of the present invention.

10: temperature management member under reduced-pressure atmosphere
12: temperature-sensitive discoloration layer
12a: print substrate
12b: hot-melt matter layer
14: protective substrate
16, 20: adhesives
18: label substrate
22: hot-melt material
24: peel-off paper

MODES FOR CARRYING OUT THE INVENTION

Embodiments for carrying out the present invention will be precisely described below, but the scope of the present invention should not be limited to these embodiments.

Figure 2:
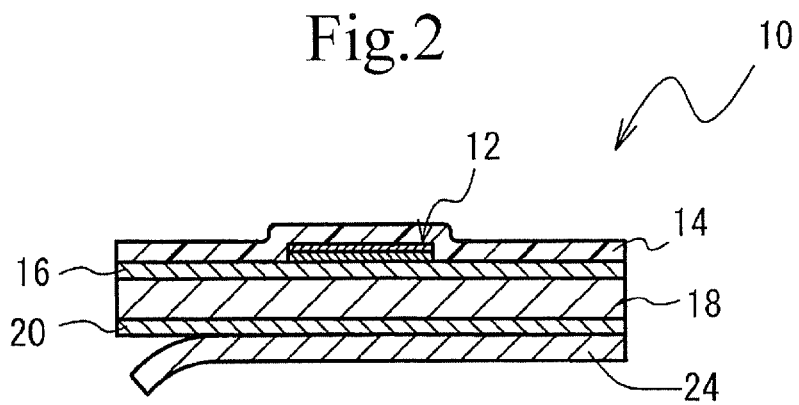
FIG. 2 is a schematic longitudinal section view showing the temperature management member under a reduced-pressure atmosphere shown in FIG. 1.
Figure 3:
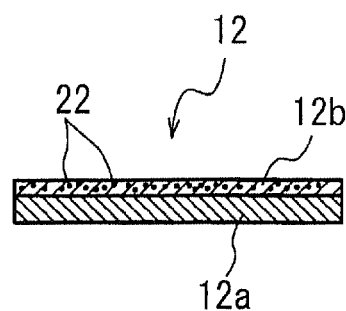
FIG. 3 is a partially enlarged schematic longitudinal section view showing a portion of the temperature management member under a reduced-pressure atmosphere shown in FIG. 1.

An example of a temperature management member under a reduced-pressure atmosphere of the present invention is shown in FIGS. 1-4. FIG. 1 is a front view showing the temperature management member under a reduced-pressure atmosphere 10. FIG. 2 is a longitudinal section view and FIG. 3 is a partially enlarged sectional view thereof. The temperature management member under a reduced-pressure atmosphere 10 shown in FIG. 1 is provided with a temperature-sensitive discoloration layer 12 at its central portion. As shown in FIG. 2 which shows the partially enlarged longitudinal section view, such temperature-sensitive discoloration layer 12 comprises a print substrate 12a on which a predetermined color is printed and a hot-melt matter layer 12b that is formed on one side of the print substrate 12a and that contains granular or powdery hot-melt matter 22, 22 . . . which is fixed by a resin. This print substrate 12a does not absorb the hot-melt matter 22, 22 . . . even when it is hot-melted. The print substrate 12a side of the temperature-sensitive discoloration layer 12 is adhered to one surface side of the label substrate 18 through a layer of adhesive 16. Further, the hot-melt matter layer 12b side of the temperature-sensitive layer 12 is abutted against a transparent protective substrate 14. This protective substrate 14 is also adhered to one surface side of the label substrate 18 through the adhesive 16. Here, on another surface side of the label substrate 18, peel-off member 24 is detachably adhered through adhesive 20.

In the temperature management member under a reduced-pressure atmosphere 10 as shown in FIG. 1, a substance having a difference of 5° C. at most in melting temperature between under an atmospheric pressure atmosphere and under a reduced-pressure atmosphere, is cautiously selected and used as hot-melt matter 22, 22 . . . as shown in FIG. 3. In particular, hot-melt matter having a difference of 5° C. at most, more preferably 2° C. in melting temperature between under an atmospheric pressure atmosphere and under a reduced-pressure of 1000 Pa or 0.1 Pa is preferably used. By using hot-melt matter that is contained within temperature-sensitive discoloration layer 12 and that reduces, as much as possible, the difference in melting temperature between under the atmospheric pressure atmosphere and under the reduced-pressure atmosphere, a discoloration of the temperature-sensitive discoloration layer 12 of the temperature management member under a reduced-pressure atmosphere 10 occurs at substantially the same temperature as observed under the atmospheric pressure atmosphere, even if under the reduced-pressure atmosphere.

Figure 4:
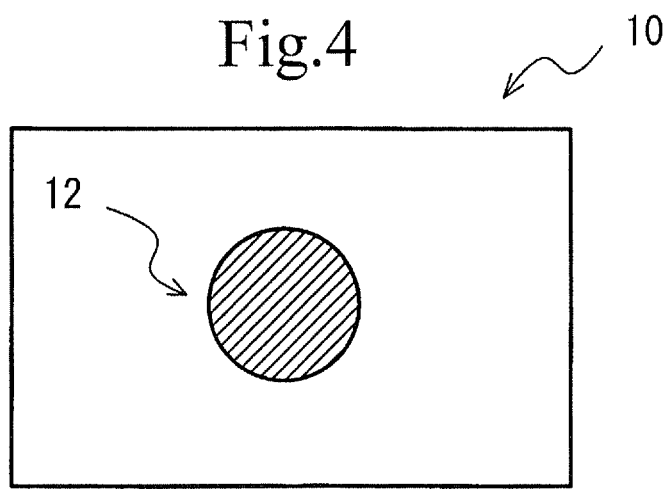
FIG. 4 is a front view showing a discolored state of the temperature-sensitive discoloration layer of the temperature management member under a reduced-pressure atmosphere shown in FIG. 1.

In such temperature management member under a reduced-pressure atmosphere 10, in a case where hot-melt matter 22, 22 . . . of a hot-melt matter layer 12b is in a state of granule or powder, the hot-melt matter 22, 22 . . . itself diffusively reflect light to cause the hot-melt matter layer 12b to become opaque. So, the color of the print substrate 12a is not visually observed from outside the temperature-sensitive discoloration layer 12. On the other hand, when the temperature management member under a reduced-pressure atmosphere 10 is heated under a reduced-pressure atmosphere, the granular or powdery hot-melt matter 22, 22 reaches its melting temperature, the hot-melt matter layer 12b is irreversibly formed into a transparent layer. Therefore, as shown in FIG. 4, the color of the print substrate 12a can be visually recognized from outside the temperature-sensitive discoloration layer 12, accordingly the discoloration of the temperature-sensitive discoloration layer 12 can be visually recognized. When once the hot-melt matter 22, 22 . . . hot melts to become a transparent candy-like amorphous solid layer, it will never return to a granular or powdery state even when it is cooled down. So, it solidifies into a transparent state and will never cause an irregular reflection.

Many of the versatile granular or powdery hot-melt matters have a different melting temperature between under the atmospheric pressure atmosphere and a reduced-pressure atmosphere. The reason of this phenomenon is not known, but ease of sublimation under the reduced-pressure atmosphere may affect this phenomenon. In this regard, hot-melt matter 22, 22 . . . that is shown in FIG. 3 and that is used for the temperature management member under a reduced-pressure atmosphere 10 can reduce as much as possible the difference in the melting temperature of a temperature-sensitive discoloration layer 12 between under a atmospheric pressure atmosphere and under a reduced-pressure atmosphere. As such granular or powdery hot-melt matter 22, 22 . . . , aliphatic compounds having at least a carbon number of 3 or benzophenone compounds can be used. As the aliphatic compounds, a fatty acid compound, a fatty acid amide compound or a fatty acid dihydrazide compound can be exemplified. As more specific granular or powdery hot-melt matter 22, 22 . . . , the aliphatic compound having a carbon number of not less than 3 such as saturated or unsaturated linear/branched or ring-like aliphatic compound, more specifically, the fatty acid compound such as myristic acid, behenic acid, sebacic acid, dodecane dioic acid; the fatty acid dihydrazide compound such as sebacic dihydrazide; benzophenone compound such as 4,4'-bis(dimethylamino) benzophenone, can be exemplified.

In a case where only one kind of hot-melt matter 22, 22 . . . is used and as a result a temperature-sensitive discoloration layer 12 exhibits no or little discoloration at a desired temperature to be detected, two kinds of hot-melt matters having a different melting point can be mixed to form a eutectic mixture, and the mixture can be used as hot-melt matter 22. Such eutectic mixture, which is obtained by mixing two kinds of hot-melt matters having different melting points, can be obtained by mixing 50-90 parts by weight of hot-melt matter with lower melting point and 50-10 parts by weight of hot-melt matter with higher melting point. The thus obtained eutectic mixture has a melting temperature lower by 1-20° C. than the melting temperature of the hot-melt matter with the lower-melting point. Further, three-component type eutectic mixture with a lower eutectic point lower than the two-components eutectic mixture can be used as hot-melt matter 22. Such three-component type eutectic mixture can be obtained by adding 10-30 parts by weight of another hot-melt matter having a melting point higher than that of the eutectic point of the two-component mixture into the two-component type eutectic mixture. If necessary, a multi-component type eutectic mixture may be formed.

The temperature management member under a reduced-pressure atmosphere 10 shown in FIG. 1 can be produced by the following procedures. A predetermined hot-melt matter is pulverized in a ball mill, etc. Then a predetermined resin and solvent are added and mixed to obtain a temperature-sensitive ink. The ink is coated and dried using a screen printing technique, on one surface side of a non-absorbable print substrate 12a which does not absorb the molten hot-melt matter 22, 22 . . . , thus, a temperature-sensitive discoloration layer 12 having a predetermined shape is formed. Here, a film, paper, print coated film, etc. can be used as the print substrate 12a. In particular, film, quality paper, print coated film having a thickness not thicker than 75 μm, especially film, quality paper, print coated film, etc. having a thickness not thicker than 50 μm are preferably used. The shape of the temperature-sensitive discoloration layer 12 can be any shape such as a circular or rectangular shape. In this regard, if the temperature-sensitive discoloration layer 12 is too large in area, visibility of the discoloration of the temperature-sensitive discoloration layer 12 is improved, but air tends to get into a place between a label substrate 18 and a protective substrate 14. The place between the label substrate 18 and the protective substrate 14 swells at the time of reduction in pressure, tending to cause discoloration error at the temperature-sensitive discoloration layer 12. Therefore, when the temperature-sensitive discoloration layer 12 is a circular shape, the diameter thereof should preferably be in the range of about 3 mm, in the light of visibility of the discoloration of temperature-sensitive discoloration layer 12. When the temperature-sensitive discoloration layer 12 is made into a shape other than a circular shape, the area of layer 12 is preferably set to the same area corresponding to a circular shape having a diameter of 3 mm.

Then, on an adhesive 16 which is placed on one surface side of a label substrate 18, other surface side of the temperature-sensitive discoloration layer 12 and a protective substrate 14 are put, and the temperature-sensitive discoloration layer 12 and the protective substrate 14 are adhered to the label substrate 18. At the same time, on the other surface side of the label substrate 18, a peel-off paper as peel-off material 24 is detachably adhered through an adhesive 20. As the protective substrate 14, a polyester type film, a polyimide type film can be used. A thin glass plate can be used as the protective substrate 14. As the label substrate 18, a polyester type film, a polyimide type film can be used. A thin glass plate can be used as the label substrate 18. However, when the label substrate 18 is too thick, thermal conductivity of the label substrate 18 is deteriorated so that the discoloration temperature of the hot-melt matter layer 12b could fluctuate, being undesirable. Therefore, the thickness of the label substrate 18 is preferably set to be not more than 75 μm. On the other surface side of such label substrate 18, the peel-off material 24 is detachably adhered through an adhesive 20. Because as the temperature management member under a reduced-pressure atmosphere 10 is used in a reduced-pressure atmosphere, the adhesives 16, 20 should be preferably of low outgassing type adhesives from which only a small amount of outgassing is generated at the time of solidification of the adhesives. As the low outgassing type adhesive, T4412W (trade name, produced by Sony Chemical & Information Device Corporation) and ATX903SF (trade name, produced by Sumitomo 3M Limited) are preferably used. At this time, the obtained temperature management member under a reduced-pressure atmosphere 10 shown in FIG. 1 is attached to an object to be heated, peel-off material 24 is separated and then exposed adhesive material 20 is adhered to a predetermined position of the object to be heated.

A present temperature management method under a reduced-pressure atmosphere using a temperature management member under a reduced-pressure atmosphere is carried out as follows. The thus obtained temperature management member under a reduced-pressure atmosphere 10 is adhered, through the adhesive 20, to the surface of an object to be heated after the peel-off paper as the peel-off material 24 is removed. Then the pressure of the atmosphere, in which the object to be heated and the temperature management member under a reduced-pressure atmosphere 10 are placed, is reduced to a predetermined pressure and then the atmosphere is heated. When the temperature of the object to be heated in the reduced-pressure atmosphere reaches the melting temperature of the granular or powdery hot-melt matter 22, 22 . . . which is contained in the temperature-sensitive discoloration layer 12, heat is directly conducted to temperature management member under a reduced-pressure atmosphere to melt the hot-melt matter 22, 22 . . . . The hot-melt matter layer 12b is changed from a non-transparent state to a transparent state. As shown in FIG. 4, the color of one surface side of the print substrate 12a can be visually recognized from outside the temperature-sensitive discoloration layer 12. The discoloration of the temperature-sensitive discoloration layer 12 is maintained even when the melted hot-melt matter is cooled down to be solidified. Accordingly, the discoloration suggests that the object to be heated has a thermal history in which the object to be heated is heated up to the discoloration temperature at which the temperature management member under a reduced-pressure atmosphere 10 is discolored. On the other hand, excessive heating of the object to be heated can be avoided by heating the object to be heated without causing discoloration of the temperature-sensitive discoloration layer 12 of temperature management member under a reduced-pressure atmosphere 10 attached to the object to be heated.

Figure 5:
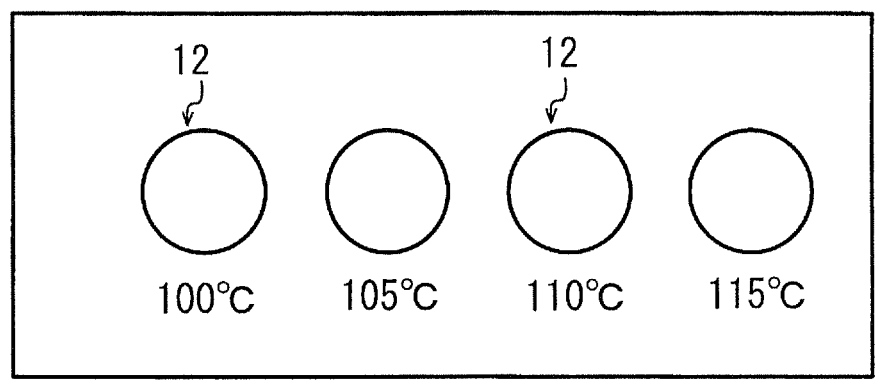
FIG. 5 is a front view showing a state before the discoloration of the temperature-sensitive discoloration layer, for explaining another example of a temperature management member under a reduced-pressure atmosphere of the present invention.
Figure 6:
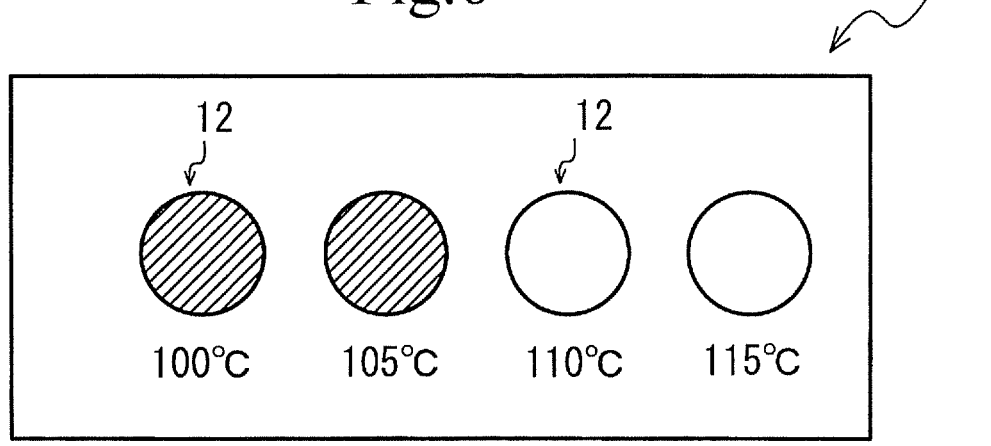
FIG. 6 is a front view showing a state of discoloration of the temperature-sensitive discoloration layer of the temperature management member under a reduced-pressure atmosphere shown in FIG. 5.

As shown in FIGS. 1-4, the temperature management member under a reduced-pressure atmosphere 10 has only one temperature-sensitive discoloration layer 12. However, as shown in FIG. 5, a plurality of temperature-sensitive discoloration layer 12, 12 . . . , each of which discolors at different temperatures independently, may be formed. In each temperature-sensitive discoloration layer of a temperature management member under a reduced-pressure atmosphere 10 shown in FIG. 5, each hot-melt matter which melts at a temperature of 100° C., 105° C., 110° C. or 115° C. is dispersed independently. Therefore, as shown in FIG. 6, in a predetermined reduced-pressure atmosphere, when the object to be heated is attached with it and heated to 105° C., temperature-sensitive discoloration layers 12, 12 for 100° C. and 105° C. discolor but temperature-sensitive discoloration layers 12, 12 for 110° C. and 115° C. do not discolor. Accordingly, these phenomena suggest that the object to be heated experiences a temperature of not less than 105° C. and not more than 115° C.

As is explained above, as the print substrate 12a which forms the temperature-sensitive discoloration layer 12 of the temperature management member under a reduced-pressure atmosphere 10, the non-absorbable print substrate 12a which does not absorb the molten hot-melt matter 22, 22 . . . is used as the print substrate. But the absorbable print substrate 12a which absorbs molten hot-melt matter 22, 22 . . . may be used. In this case, the molten hot-melt matter 22, 22 . . . is absorbed into the print substrate and the hot-melt matter layer 12b becomes transparent so that a color, character, graphic, etc. on the surface of print substrate 12a can be visually recognized. The temperature-sensitive discoloration layer 12 can be discolored. Granular or powdery hot-melt matter 22, 22 . . . may be placed together with pigment in a hot-melt matter layer 12b. In this case, discoloration of the temperature-sensitive discoloration layer 12 can be carried out by dissolution of the pigment into molten hot-melt matter 22. Here, the degree of vacuum of the reduced-pressure atmosphere is not specifically limited as long as the pressure is not more than the atmospheric pressure (one atm: around $1 \times 10^5$ Pa), preferably 1000 Pa at highest, more preferably 0.1 to 1000 Pa, which are used for industrial applications.

DESCRIPTION OF EMBODIMENT

Manufacturing examples of temperature management members under a reduced-pressure atmosphere and examples of a temperature management method under a reduced-pressure atmosphere of the present invention will be precisely explained, hereinafter.

Example 1

Each species and amount of a hot-melt matter described in Table 1 was pulverized using a winder blender. The pulverized hot-melt matter and each species and amount of a resin and a solvent shown in Table 1 were kneaded using a ball mill for a day and a night to produce an ink. The thus obtained ink was screen printed on one surface side of black high-grade special-light paper having a thickness of 75 μm as a print substrate 12a. After drying for a day and a night to form a hot-melt matter layer 12b, a circle having a diameter of 2 mm was punched out using a punch to obtain a temperature-sensitive discoloration layer 12. Next, on one surface side of polyimide film [Kapton 100H (trade name), produced by DU PONT-TORAY Co., Ltd.] as a label substrate 18, the temperature-sensitive discoloration layer 12 and a protective substrate 14 [Kapton 100H (trade name) for protection, produced by T DU PONT-TORAY Co., Ltd.] and overlapped, were adhered through a low outgassing type adhesive 16 [T4412W (trade name), produced by Sony Chemical & Information Device Corporation]. Further, to the other surface side of the label substrate 18, peel-off paper as a peel-off material 24 was detachably adhered through a low-outgassing type adhesive 20 [ATX903SF (trade name), produced by Sumitomo 3M Limited]. Thus temperature management member under a reduced-pressure atmosphere 10, as shown in FIG. 1, was obtained.

Discoloration temperatures at which the hot-melt matter in hot-melt matter layer 12b of the obtained temperature management member under a reduced-pressure atmosphere 10 was molten and the temperature-sensitive discoloration layer 12 was discolored, was measured. As a device for measuring a temperature in a reduced-pressure atmosphere, a "Vacuum Temperature Measuring Device" produced by VIC International Inc. was used. This device comprises a vacuum chamber in which the pressure is controlled by a microcontroller and a built-in hot plate placed in the chamber and made by copper plate that holds uniform heat distribution. On the hot plate, a platinum resistance temperature detector (A class) was provided to detect the surface temperature of the hot plate. This platinum resistance temperature detector was already calibrated over the range of 0-300° C. with an accuracy of ±0.75° C. by Netsushin Co., Ltd. The measurement was carried out using this vacuum temperature measuring device as follows. The obtained temperature management member under a reduced-pressure atmosphere 10 was adhered to the hot plate in the chamber, after removing the peel-off paper as peel-off material 24. Then the pressure was adjusted to a pressure described in Table 1. After that, the hot plate was heated at the rate of 2-3° C./min. Then a temperature, at which temperature-sensitive discoloration layer 12 completely discolored, was measured. The measurement was carried out three times. The three measured values were averaged and showed in Table 2. Here, the pressure in the vacuum chamber was adjusted to maintain the specified pressure during the hot plate temperature was elevated.

TABLE 1

| No. | Hot-melt matter 1 | Hot-melt matter 2 | 8% ETHOCEL (n-Amyl-alcohol) | n-Amyl-alcohol |
|---|---|---|---|---|
| 1 | Myristic acid (mp 54° C.) 100 g | | 100 g | 80 g |
| 2 | Behenic acid (mp 81° C.) 70 g | Myristic acid anilide (mp 84° C.) 30 g | 100 g | 70 g |
| 3 | Stearic acid amide (mp 108° C.) 45 g | N, N-Ethylene bis stearic acid amide (mp 144° C.) 20 g | 100 g | 100 g |
| 4 | Dodecane dioic acid (mp 129° C.) 100 g | | 100 g | 60 g |
| 5 | N,N-Propylene bis dodecanoic acid amide (mp 135° C.) 70 g | | 100 g | 60 g |
| 6 | N,N-Ethylene bis myristic acid amide (mp 155° C.) 70 g | | 100 g | 50 g |
| 7 | 4,4'-Bis (dimethylamino) benzophenone (mp 174° C.) 100 g | | 100 g | 100 g |
| 8 | Sebacic acid dihydrazide (mp 186° C.) 80 g | | 100 g | 70 g |
| 9 | Sebacic acid (mp 134° C.) 70 g | N,N-Ethylene bis stearic acid amide (mp 144° C.) 30 g | 100 g | 40 g |

TABLE 2

| | Melting temperature under Ambient pressure | | | Difference in Temperature (between under Atmospheric pressure and under each Reduced-pressure) | |
|---|---|---|---|---|---|
| No | Atmospheric pressure | 1000 Pa | 0.1 Pa | 1000 Pa | 0.1 Pa |
| 1 | 51.8° C. | 51.5° C. | 51.4° C. | −0.3° C. | −0.4° C. |
| 2 | 71.8° C. | 71.7° C. | 71.8° C. | −0.1° C. | ±0.0° C. |
| 3 | 99.8° C. | 98.6° C. | 99.2° C. | −1.2° C. | −0.6° C. |
| 4 | 128.0° C. | 128.2° C. | 126.4° C. | +0.2° C. | −1.0° C. |
| 5 | 133.5° C. | 134.4° C. | 133.8° C. | +0.9° C. | +0.3° C. |
| 6 | 155.2° C. | 155.3° C. | 154.6° C. | +0.1° C. | −0.6° C. |
| 7 | 177.7° C. | 174.4° C. | 175.3° C. | −3.3° C. | −2.4° C. |
| 8 | 187.9° C. | 185.1° C. | 184.2° C. | −2.8° C. | −3.7° C. |
| 9 | 119.4° C. | 120.4° C. | 118.7° C. | +1.0° C. | +0.7° C. |

As clearly seen in Tables 1 and 2, in the temperature management members under a reduced-pressure atmosphere 10 in No. 1-9, the difference in the discoloration temperature of temperature-sensitive discoloration layer 12 between under the atmospheric pressure atmosphere and under the reduced-pressure atmosphere were substantially constant or not more than 5° C. Accordingly, the temperature management member under a reduced-pressure atmosphere 10 can be advantageously used for industrial purposes. In particular, the difference in the melting temperature of the hot-melt matter of the temperature management member under a reduced-pressure atmosphere 10 of No. 1-6 and No. 9 between under the atmospheric pressure atmosphere and under 1000 Pa atmosphere or under 0.1 Pa atmosphere, was not more than 2° C., showing that the discoloration temperatures are very stable over a broad range of the reduced atmosphere (from 1000 Pa to 0.1 Pa). On the other hand, in the temperature management members under the reduced pressure atmosphere 10 of No. 7 and 8, the maximum difference in the discoloration temperature of the temperature-sensitive discoloration layer 12 between under the atmospheric pressure atmosphere and under the reduced-pressure atmosphere of 1000 Pa, was 3.7° C. This value is inferior to that of the temperature management members under the reduced-pressure atmosphere of No. 1-6 and No. 9. However, the values are within the acceptable range for industrial purposes.

Example 2

A temperature management member under a reduced-pressure atmosphere 10 was produced in the same manner as in Example 1 except that a general-use adhesive [465 (trade name), produced by Sumitomo 3M Limited] was used instead of the low outgassing type adhesives 16, 20 which was used in the temperature management member under a reduced-pressure atmosphere 10 of No. 9. Discoloration temperature of the temperature-sensitive discoloration layer 12 of the obtained temperature management member under the reduced-pressure atmosphere 10 was measured in the same manner as in Example 1. The result is shown as No. 10 in Table 3 below.

Example 3

A temperature management member under a reduced-pressure atmosphere 10 was obtained in the same manner as in Example 1 except that "belle couleur paper" having a thickness of 120 μm was used, instead of a high-quality special-light paper having a thickness of 75 μm, as a print substrate 12a of temperature management member under a reduced-pressure atmosphere 10 in No. 9. Discoloration temperature of the temperature-sensitive discoloration layer 12 of the obtained temperature management member under a reduced-pressure atmosphere 10 was measured in the same manner as in Example 1. The results are shown as No. 11 in Table 3 below.

TABLE 3

| | Melting temperature under Ambient pressure | | | Difference in Temperature (between under Atmospheric pressure and under each Reduced-pressure) | |
|---|---|---|---|---|---|
| No. | Atmospheric pressure | 1000 Pa | 0.1 Pa | 1000 Pa | 0.1 Pa |
| 10 | 119.6° C. | 120.8° C. | 119.6° C. | +0.9° C. | ±0.0° C. |
| 11 | 122.4° C. | 127.3° C. | 126.4° C. | +4.9° C. | +4.0° C. |

As shown in FIG. 3, the difference in discoloration temperature of temperature-sensitive discoloration layer 12 of the temperature management member under the reduced-pressure atmosphere 10 of No. 11 between under the atmospheric pressure atmosphere and under the 1000 Pa pressure atmosphere, was 4.9° C. The temperature management member under the reduced-pressure atmosphere 10 of No. 11 was inferior to the temperature management member under the reduced-pressure atmosphere 10 of No. 10. However, the value is still within the acceptable range for industrial purposes. The discoloration temperature under the reduced-pressure atmosphere 10 of No. 11 was shifted toward a high temperature side. The reason of these shifts may be explained as follows. The heating, under a reduced-pressure atmosphere, of the hot-melt matter which exists within the temperature-sensitive discoloration layer 12, was mainly carried out through thermal conduction, so that the shifts may occur due to thickened print substrate 12a which may work as a kind of heat insulator.

Comparative Example 1

Temperature management members under a reduced-pressure atmosphere 10 were produced in the same manner as described in Example 1 except that hot-melt matter, a resin and a solvent described in Table 4 were used. Discoloration temperatures of temperature-sensitive discoloration layer 12 of the obtained temperature management members under the reduced-pressure atmosphere 10 were measured in the same manner as that of Example 1. The results are shown in Table 5 below.

TABLE 4

| No. | Hot-melt matter | 8% ETHOCEL (n-Amylalcohol) | n-Amyl-alcohol |
|---|---|---|---|
| 12 | m-Aminophenol 5 g | 10 g | 10 g |
| 13 | Dimedone 5 g | 10 g | 10 g |
| 14 | Diglycolic acid 5 g | 10 g | 10 g |
| 15 | N-(Hydroxymethyl)phthalimide 5 g | 10 g | 10 g |
| 16 | Carbazole 5 g | 10 g | 10 g |
| 17 | Xanthone 5 g | 10 g | 10 g |
| 18 | Oxalic acid hydrazide 5 g | 10 g | 10 g |

TABLE 5

| | Melting temperature under Ambient pressure | | | Difference inTemperature (between under Atmospheric pressure and under each Reduced-pressure) | |
|---|---|---|---|---|---|
| No | Atmospheric pressure | 1000 Pa | | Atmospheric pressure | 1000 Pa |
| 12 | 119.1° C. | 107.8° C. | 105.5° C. | −11.3° C. | −13.6° C. |
| 13 | 135.5° C. | 116.7° C. | 112.9° C. | −18.8° C. | −22.6° C. |
| 14 | 141.8° C. | 122.8° C. | 126.3° C. | −19.0° C. | −15.5° C. |
| 15 | 147.9° C. | 129.9° C. | 134.5° C. | −18.0° C. | −13.4° C. |
| 16 | 172.1° C. | 135.4° C. | 140.2° C. | −36.7° C. | −31.9° C. |
| 17 | 173.4° C. | 143.4° C. | 140.2° C. | −30.0° C. | −33.2° C. |
| 18 | 206.8° C. | 160.7° C. | 171.7° C. | −46.1° C. | −35.1° C. |

As clearly seen from Tables 4 and 5, the difference in discoloration temperatures of the temperature-sensitive discoloration layer 12 of the temperature management members under the reduced-pressure atmosphere 10 of No. 12 to 18, between under the atmospheric pressure atmosphere and under the reduced-pressure atmosphere of 1000 Pa or 0.1 Pa, are beyond the difference of 5° C. Therefore, the temperature management members under the reduced-pressure atmosphere of No. 12 to 18 cannot be used for industrial purposes.

INDUSTRIAL APPLICABILITY

The temperature management member under a reduced-pressure atmosphere of the present invention can be used as attached to an object to be heated under a reduced-pressure atmosphere, to monitor a heating temperature of the object to be heated and to protect the object to be heated from being subjected to an excessive heating. Further, with the present temperature management member under a reduced-pressure atmosphere being attached to the object to be heated, temperature change of the object to be heated can be confirmed.

What is claimed is:

1. A temperature management member under a reduced-pressure atmosphere of at most 1000 Pa comprising:
    a temperature-sensitive discoloration layer which contains a granular or powdery hot-melt matter that melts at a melting temperature corresponding to a heating temperature to be detected under the reduced-pressure atmosphere and which discolors in response to the hot melting of the hot-melt matter,
    wherein a difference in the melting temperature of the hot-melt matter within the temperature-sensitive discoloration layer between any two pressures selected from the group consisting of under an atmospheric pressure atmosphere, under a reduced-pressure atmosphere of 1000 Pa, and under a reduced-pressure atmosphere of 0.1 Pa is 5° C. at most, and
    the hot-melt matter melts at substantially the same temperature under any reduced-pressure atmosphere in the range of 0.1 Pa to 1000 Pa.

2. The temperature management member under a reduced-pressure atmosphere according to claim 1, wherein the difference in the melting temperature of the hot-melt matter between said any two pressures is 2° C. at most.

3. The temperature management member under a reduced-pressure atmosphere according to claim 1, wherein the temperature-sensitive discoloration layer comprises:
    a hot-melt matter layer containing granular or powdery hot-melt matter; and
    a substrate having the hot-melt matter layer on one surface side thereof, and the temperature-sensitive discoloration layer discolors in response to the hot melting of the hot-melt matter, by the hot-melt matter layer becoming transparent and accordingly a surface of the substrate being visually recognized, and/or by the granular or powdery hot-melt matter dissolved with a pigment that coexists therewith.

4. The temperature management member under a reduced-pressure atmosphere according to claim 3, wherein the substrate is an absorbable substrate.

5. The temperature management member under a reduced-pressure atmosphere according to claim 1, wherein the hot-melt matter is a eutectic mixture which comprises at least two kinds of hot-melt matters each having a different melting point.

6. The temperature management member under a reduced-pressure atmosphere according to claim 5, wherein the eutectic mixture comprises at least two kinds of the hot-melt matters each having a different melting point, one of the hot-melt matter in the eutectic mixture which has the lowest melting point is contained in the range of 50-90 parts by weight, and another one of the hot-melt matter in the eutectic mixture which has the highest melting point is contained in the range of 50-10 parts by weight.

7. The temperature management member under a reduced-pressure atmosphere according to claim 1, wherein the hot-melt matter is an aliphatic compound having at least a carbon number of 3 or a benzophenone compound.

8. The temperature management member under a reduced-pressure atmosphere according to claim 7, wherein the aliphatic compound is at least any one of a compound selected from the group consisting of a fatty acid compound, a fatty acid amide compound and a fatty acid dihydrazide compound.

9. A temperature management method under a reduced-pressure atmosphere comprising steps of:

making a temperature-sensitive discoloration layer containing a granular or powdery hot-melt matter that melts at a melting temperature corresponding to a heating temperature to be detected under the reduced pressure atmosphere;

adjusting a difference in a melting temperature of the hot-melt matter in the temperature-sensitive discoloration layer, between any two pressures selected from the group consisting of under an atmospheric pressure atmosphere, under a reduced-pressure atmosphere of 1000 Pa, and under a reduced-pressure atmosphere of 0.1 Pa, to be 5° C. at most thereby;

preparing the temperature management member under the reduced-pressure atmosphere by arranging a temperature-sensitive discoloration layer which discolors in response to the hot melting, on a substrate thereby;

heating the temperature management member together with the object to be heated at the time of heating the object to be heated under a reduced-pressure atmosphere of at most 1000 Pa; and managing a history that shows whether or not the heating temperature to heat the object to be heated reaches at a temperature to be detected, by checking the discoloration of the temperature-sensitive discoloration layer of the temperature management member, wherein the hot-melt matter melts at substantially the same temperature under any reduced-pressure atmosphere in the range of 0.1 Pa to 1000 Pa.

10. The temperature management method under a reduced-pressure atmosphere according to claim 9, wherein the hot-melt matter is an aliphatic compound having at least a carbon number of 3 or a benzophenone compound.

* * * * *